(12) United States Patent
Kim

(10) Patent No.: US 8,559,927 B2
(45) Date of Patent: Oct. 15, 2013

(54) DUMMY INFORMATION FOR LOCATION PRIVACY IN LOCATION BASED SERVICES

(75) Inventor: Seungil Kim, Seoul (KR)

(73) Assignee: Empire Technology Development, LLC, Wilmington, DE (US)

( * ) Notice: Subject to any disclaimer, the term of this patent is extended or adjusted under 35 U.S.C. 154(b) by 0 days.

(21) Appl. No.: 13/119,413

(22) PCT Filed: Dec. 21, 2010

(86) PCT No.: PCT/US2010/061541
§ 371 (c)(1),
(2), (4) Date: Mar. 16, 2011

(87) PCT Pub. No.: WO2012/087296
PCT Pub. Date: Jun. 28, 2012

(65) Prior Publication Data
US 2012/0309350 A1 Dec. 6, 2012

(51) Int. Cl.
*H04W 12/02* (2009.01)
(52) U.S. Cl.
USPC .......................................... 455/411; 455/410
(58) Field of Classification Search
USPC ............................. 455/410, 411, 414.1, 414.2
See application file for complete search history.

(56) References Cited

U.S. PATENT DOCUMENTS

| | | | |
|---|---|---|---|
| 6,741,575 B1 | 5/2004 | Zhang et al. |
| 6,816,735 B1 | 11/2004 | Rayburn et al. |
| 6,847,633 B1 | 1/2005 | Ryu et al. |
| 6,850,252 B1 | 2/2005 | Hoffberg |
| 6,879,965 B2 | 4/2005 | Fung et al. |
| 7,043,637 B2 | 5/2006 | Bolosky et al. |
| 7,130,807 B1 | 10/2006 | Mikurak |
| 7,136,927 B2 | 11/2006 | Traversat et al. |
| 7,158,775 B1 | 1/2007 | Esaka |
| 7,251,050 B2 | 7/2007 | Lapstun et al. |
| 7,395,536 B2 | 7/2008 | Verbeke et al. |
| 7,415,608 B2 | 8/2008 | Bolosky et al. |
| 7,415,617 B2 | 8/2008 | Ginter et al. |
| 7,472,093 B2 | 12/2008 | Juels |
| 7,636,848 B2 | 12/2009 | Caprella et al. |
| 7,660,973 B2 | 2/2010 | Hansen et al. |
| 7,688,820 B2 | 3/2010 | Forte et al. |
| 7,701,954 B2 | 4/2010 | Rabenko et al. |
| 7,707,621 B2 | 4/2010 | Walmsley |
| 7,730,287 B2 | 6/2010 | Hansen et al. |
| 7,752,466 B2 | 7/2010 | Ginter et al. |

(Continued)

OTHER PUBLICATIONS

Kido et al., "An Anonymous Communication Technique using Dummies for Location-based Services" http://citeseerx.ist.psu.edu/viewdoc/download?doi=10.1.1.101.2045&rep=rep1&type=pdf.

(Continued)

*Primary Examiner* — Cong Tran
(74) *Attorney, Agent, or Firm* — Turk IP Law, LLC

(57) ABSTRACT

Technologies are generally described for location privacy protection. In some examples, location privacy protection is provided by determining a maximum number of dummy location information sets to be transmitted to an LBS provider along with actual location information based on a comparison of expected LBS data to be received and bandwidth availability, as well as expected power usage on a mobile device transmitting the information and available power for the mobile device. The dummy information may be generated such that realistic trajectories are obtained without enabling an intruder to detect a user's actual path when the user is moving.

17 Claims, 9 Drawing Sheets

(56) References Cited

U.S. PATENT DOCUMENTS

| | | |
|---|---|---|
| 7,758,143 B2 | 7/2010 | Silverbrook et al. |
| 7,760,716 B2 | 7/2010 | Beshai |
| 7,768,951 B2 | 8/2010 | Kubler et al. |
| 7,770,008 B2 | 8/2010 | Walmsley |
| 7,773,536 B2 | 8/2010 | Lloyd et al. |
| 7,773,741 B1 | 8/2010 | LeBlanc et al. |
| 7,774,495 B2 | 8/2010 | Pabla et al. |
| 7,783,886 B2 | 8/2010 | Walmsley |
| 7,804,849 B2 | 9/2010 | Mahany et al. |
| 7,808,503 B2 | 10/2010 | Duluk, Jr. et al. |
| 7,817,627 B2 | 10/2010 | Beshai |
| 7,818,519 B2 | 10/2010 | Plunkett |
| 7,818,548 B2 | 10/2010 | Hansen et al. |
| 7,822,005 B2 | 10/2010 | Ptasinski et al. |
| 2008/0132250 A1 | 6/2008 | Harris |
| 2010/0064373 A1 | 3/2010 | Cai et al. |
| 2010/0070758 A1* | 3/2010 | Low et al. ................ 713/155 |
| 2010/0127920 A1 | 5/2010 | Harper et al. |
| 2011/0131521 A1* | 6/2011 | Cho et al. ................ 715/772 |

OTHER PUBLICATIONS

Yanagisawa et al., "Location Traceability of Users in Location-based Services" http://www.kecl.ntt.co.jp/csl/sirg/people/kani/Work/mobi_yanagisawa.pdf.

Beresford et. al, "Location Privacy in Pervasive Computing," IEEE Pervasive Computing, Jan.-Mar. 2003. http://goo.gl/YBpW.

Nezhad et al., "Location privacy and anonymity preserving routing for wireless sensor networks", School of Information Technology and Engineering, University of Ottawa, 800 King Edward Avenue, Ottawa, Ontario, Canada K1N 6N5.

Mohamed F. Mokbel, "Privacy in Location-Based Services: State-of-the-art and Research Directions," Tutorial Material of MDM 2007. http://goo.gl/ub17.

International Search Report and Written Opinion PCT/US10/61541 Date Feb. 15, 2011.

* cited by examiner

DUMMY INFORMATION FOR LOCATION PRIVACY IN LOCATION BASED SERVICES

CROSS REFERENCE TO RELATED APPLICATIONS

This application claims the benefit of International Patent Application Serial No. PCT/US10/615,41 filed on Dec. 21, 2010. The disclosures of the International Patent Application are hereby incorporated by reference for all purposes.

BACKGROUND

Unless otherwise indicated herein, the materials described in this section are not prior art to the claims in this application and are not admitted to be prior art by inclusion in this section.

The recovery of the location of a mobile device, such as a cellular telephone or a smart phone, is the basis for a wide range of Location-Based-Services (LBS). A Location Based Service is an information service, accessible to mobile devices through the cellular network utilizing the geographical position of the mobile device. Location based services can be used in a variety of contexts, such as health, work, personal, and entertainment by identifying the location of an individual or object using the position of the mobile device and providing the individual with information regarding various service providers in the proximate location as the individual. LBS can include sending advertising directed at customers based on their location, personalized weather services, locations of restaurants, gas stations, other businesses, and comparable services.

Transferring user location information in LBS may be privacy concern. Therefore, various privacy protection methods have been developed. One of the methods for privacy protection involves sending anonymous information or false dummies along with the user's real location information. For example, if the user is sending four sets of anonymous location information in addition to the user's real location information, there are five sets of location information in total. Therefore, spatial cloaking effect can be achieved. However, transmitting and receiving a large amount of irrelevant data may degrade channel efficiency. For each set of anonymous location information sent, a number of LBS offers may be received, clogging communication channels, which typically have a limited bandwidth. Furthermore, in pay-per-data-amount type plans, users may quickly use up their allocated data amounts. Yet another concern may be power usage on mobile devices, which is also typically limited in availability and continuous use of location determination services such as GPS to generate dummy data may waste valuable battery power.

SUMMARY

The present disclosure describes a method for protecting location privacy by employing dummy information when using location based services. The method may include connecting to a location based service (LBS) provider and submitting a user's actual location and a first sub-group of dummy locations to the LBS provider. The first sub-group may be selected among a total group of dummy locations based on one or more constraints comprising an available bandwidth, a power consumption of a computing device connecting to the LBS provider, and/or a service requirement of the LBS provider. The method may further include receiving location based service data associated with a second sub-group of dummy locations and the user's actual location from the LBS provider, where the second sub-group is a subset of the first sub-group.

The present disclosure further provides an apparatus for protecting location privacy by employing dummy information when using location based services. The apparatus may include a memory configured to store instructions and a processor coupled to the memory and adapted to execute the instructions. When the instructions are executed they may cause the processor to connect to a location based service (LBS) provider and submit a user's actual location and a first sub-group of dummy locations to the LBS provider. The first sub-group may be selected among a total group of dummy locations based on one or more constraints comprising an available bandwidth, a power consumption of apparatus, and/or a service requirement of the LBS provider. The processor may also receive location based service data associated with a second sub-group of dummy locations and the user's actual location from the LBS provider, where the second sub-group is a subset of the first sub-group.

The present disclosure also describes a computer-readable storage medium with instructions stored thereon for a method of protecting location privacy by employing dummy information when using location based services. The method may include connecting to a location based service (LBS) provider and submitting a user's actual location and a first sub-group of dummy locations to the LBS provider. The first sub-group may be selected among a total group of dummy locations based on one or more constraints comprising an available bandwidth, a power consumption of a computing device connecting to the LBS provider, and/or a service requirement of the LBS provider. The method may further include receiving location based service data associated with a second sub-group of dummy locations and the user's actual location from the LBS provider, where the second sub-group is a subset of the first sub-group.

The present disclosure describes yet another method for enabling protection of location privacy by employing dummy information in conjunction with location based services. The method may include registering a user at a location based service (LBS) provider and receiving the user's actual location and a first sub-group of dummy locations at the LBS provider. The first sub-group may be selected among a total group of dummy locations based on one or more constraints comprising an available bandwidth, a power consumption of a computing device connecting to the LBS provider, and/or a service requirement of the LBS provider. LBS data associated with a second sub-group of dummy locations and the user's actual location may be provided to the computing device connecting to the LBS provider, where the second sub-group is a subset of the first sub-group.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The below described and other features of this disclosure will become more fully apparent from the following description and appended claims, taken in conjunction with the accompanying drawings. Understanding that these drawings depict only several embodiments in accordance with the disclosure and are, therefore, not to be considered limiting of its

DETAILED DESCRIPTION

Figure 1:
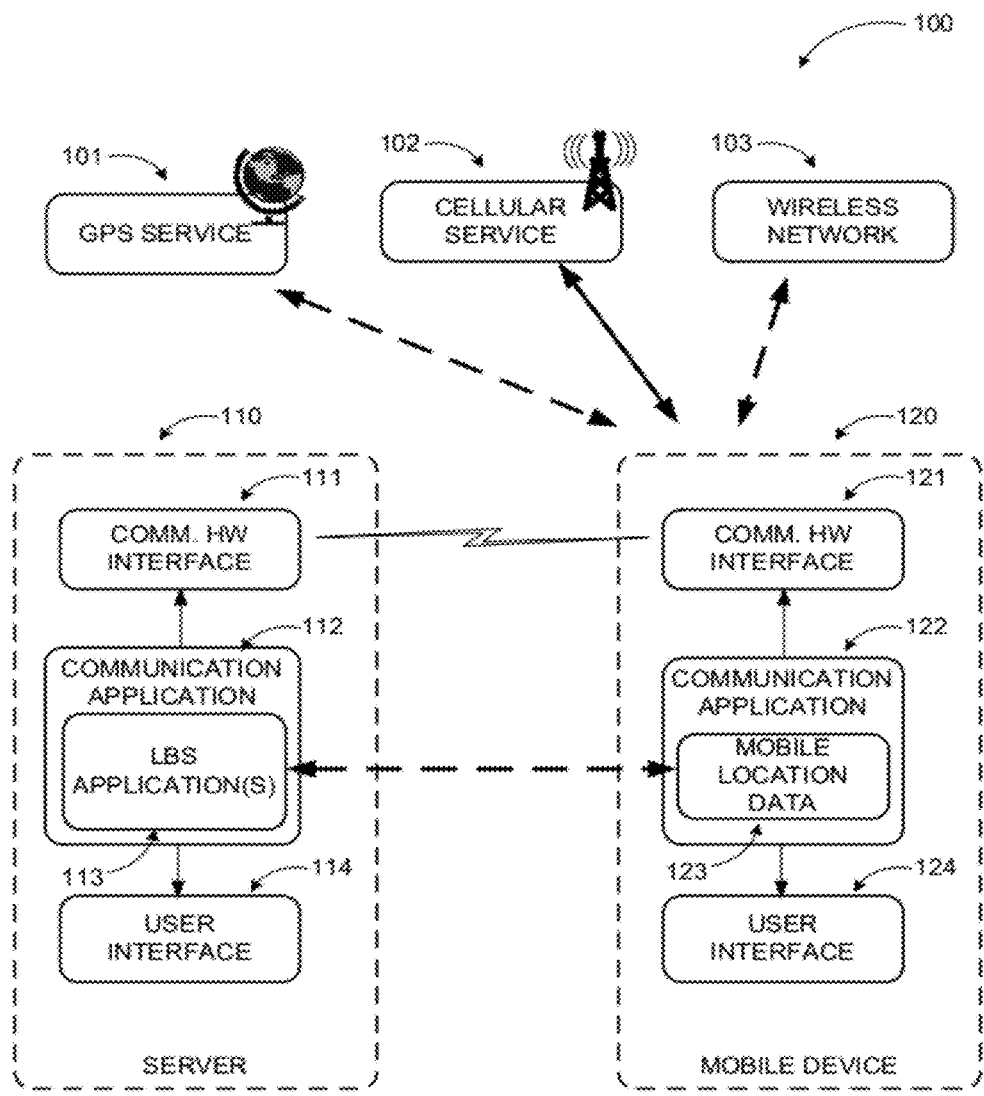
FIG. 1 illustrates a block diagram of an example system for providing location based services to a mobile device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to privacy protection in transmitting location data to location based service (LBS) providers.

Briefly stated, a maximum number of dummy location information sets to be transmitted to an LBS provider along with actual location information for protection of privacy may be determined based on a comparison of expected LBS data to be received and bandwidth availability, as well as expected power usage on a mobile device transmitting the information and available power for the mobile device. According to some embodiments, the dummy information may be generated such that realistic trajectories are obtained without enabling an intruder to detect a user's actual path when the user is moving.

FIG. 1 illustrates a block diagram 100 of an example system for providing location based services to a mobile device in accordance with at least some embodiments described herein. The mobile device operating environment shown in the diagram 100 may include a mobile device 120 connected to a cellular service 102, a GPS service 101, and/or wireless networks 103, which may interact with the mobile device 120 to provide mobile location data and other services.

The mobile device 120 may include a mobile location data module 123 for obtaining data related to a mobile location or geographical position of the mobile device, such as GPS specific location of the mobile device or the cellular tower signal strength of surrounding cellular towers, or the signal strength of surrounding WLAN spots. The mobile device 120 may continuously or periodically gather and store mobile location data and signal strength data and then communicate the mobile location data to a server 110 via the cellular network or another wireless network. Because transmitting information can be energy costly, the device may send updates when it has access to an accurate location (e.g., GPS) to update the server, and occasionally when it does not have access to GPS. LBS application(s) 113 of the server 110 may store and process the location data to provide location based services such as shopping suggestions, discount coupons, mapping services, or comparable ones.

The mobile device 120 and the server 110 may communicate through their respective communication applications 122 and 112 employing communication hardware interfaces 121 and 111. To protect a user's location privacy, the mobile location data module 123 may generate a number of dummy location information sets (anonymities) and transmit them to the LBS application(s) 113. In response, the mobile device 120 may receive LBS offers for the submitted location data (including the dummy information) and select among those for the actual location, protecting the user's actual location in the process. Since receiving a multitude of LBS offer data may consume valuable bandwidth, which is typically limited for physical reasons or system requirements (e.g., user allocated bandwidth), and the additional amount of communication/processing may use up the commonly limited supply of power for the mobile device 120, a maximum number of dummy location information sets may be determined based on those two limitations in a system according to some embodiments. Various operational aspects of the server 110 may be controlled through its user interface 114. Similarly, users may be enabled to provide preferences and receive LBS through a user interface 124 of the mobile device 120.

Figure 2:
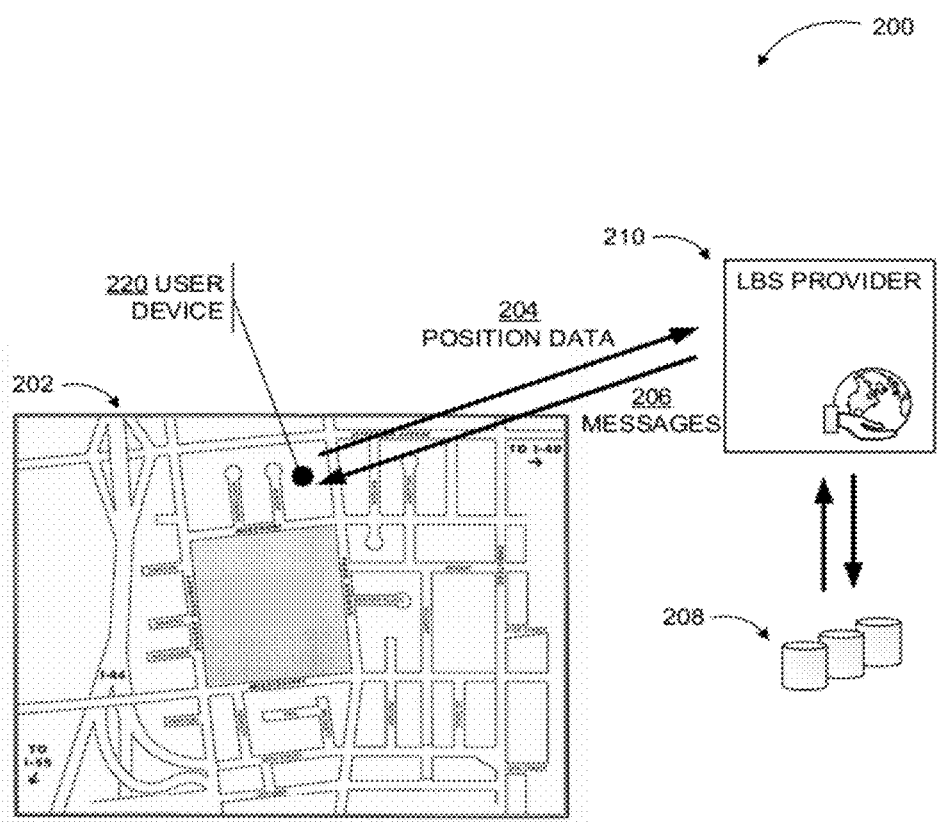
FIG. 2 illustrates an example environment for implementing location based services.

FIG. 2 illustrates an example environment for implementing location based services in accordance with at least some embodiments described herein. As depicted, a diagram 200 shows a user with a mobile device 220 at a specific location on a map 202. Upon determining its location through, for example, a location determination service such as Global Positioning Service (GPS), the mobile device may transmit its position data 204 to an LBS provider 210. The LBS provider 210 may look up available services at data stores 208 based on the received location data and transmit messages 206 with location based services to the mobile device 220.

The communication between the mobile device 220 and the LBS provider 210 may be captured by an intruder, however, and the user's actual location determined. To protect the user's location privacy, dummy location information may be transmitted along with the actual location information in a system according to some embodiments. While the protection may increase with a number of the dummy location data sets transmitted, the efficiency of the system may decrease because generation and transmission of each dummy location data set, as well as receiving of services in response may consume bandwidth and mobile device power.

According to some embodiments, channel efficiency may be asymmetrically increased by setting a number of anonymities (dummy location data) for receiving location based service information from a service provider. Generally, received LBS data is substantially larger than the transmitted location data. Therefore, exchanged data quantity may be reduced if a smaller number of anonymities is used when receiving data compared to sending location information. The received data from the user's service provider is typically safer from intrusions since they are artificial data compared to the raw location data transmitted to the service provider.

According to other embodiments, power consumption at the mobile device receiving LBS data may also be considered. Mobile devices typically have a limited amount of available power (battery, solar, or similar). A majority of available power is consumed in active communication such as receiving large amounts of LBS data. Thus, by limiting the number of transmitted dummy location data sets based on available power at the mobile device may preserve power.

A mobile device typically transmits the location information when using a location determination service such as GPS, which further consumes power. According to further embodiments, the dummy location information may be transmitted at predefined periods or random intervals even if the user is not using the location determination service (e.g., the GPS service is turned off), which may make is virtually impossible for an intruder to grasp the real-time position of the user.

An additional consideration may involve service requirements. For example, users may be allocated a limited amount of bandwidth or data to be transferred in a given period of time (e.g., monthly data allocations). Thus, the number of dummy location data sets to be transmitted may further be limited based on such service requirements and current usage levels.

Figure 3:
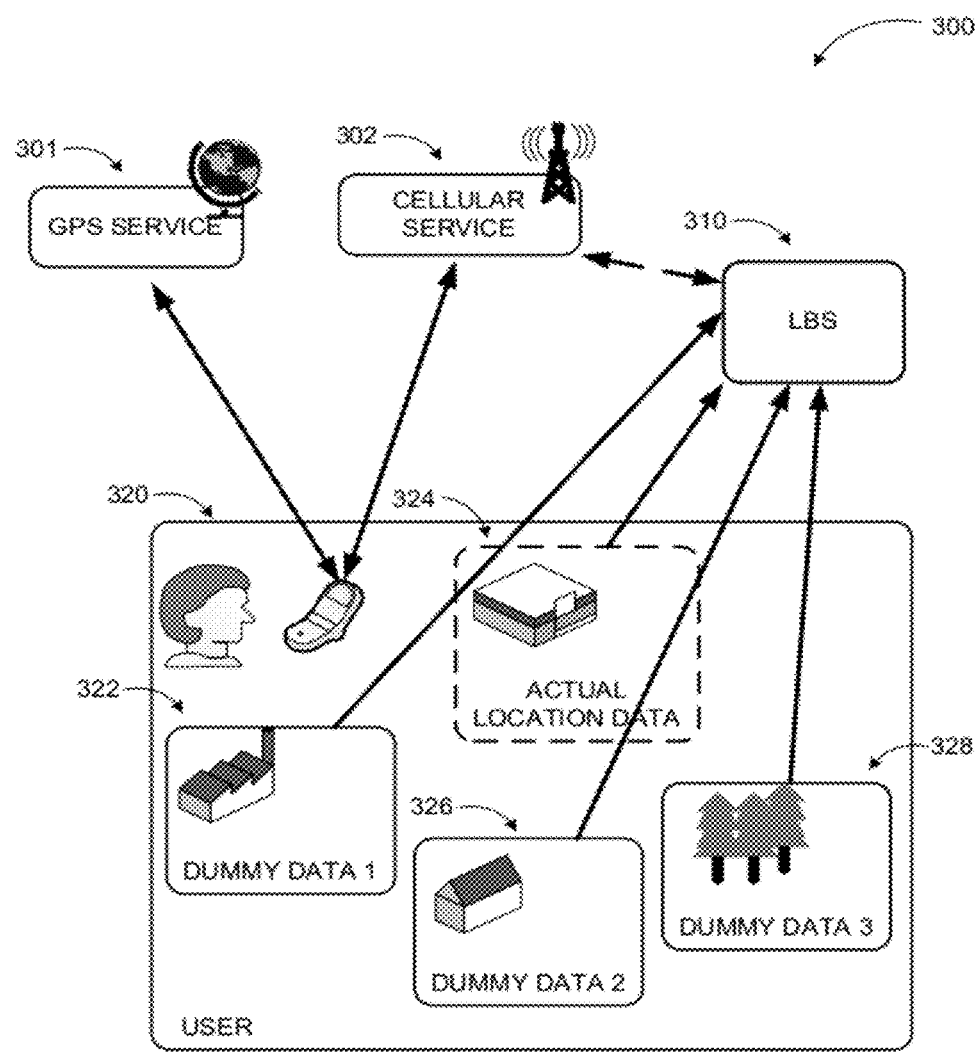
FIG. 3 illustrates a conceptual diagram of providing dummy information to a location based service for location privacy protection.

FIG. 3 illustrates a conceptual diagram 300 of providing dummy information to a location based service for location privacy protection in accordance with at least some embodiments described herein. As depicted, the diagram 300 shows how a mobile device 320 of a user can obtain location information from a GPS service 301 or a cellular service 302 (or other services as discussed previously). The mobile device 320 may then provide actual location data 324 to an LBS provider 310 through the cellular service 302 or other means (e.g., a wireless LAN connection, a wired connection, etc.) and receive data associated with location based services. To protect location privacy of the user, the mobile device 320 may transmit along with the actual location data 324 sets of dummy location data 322, 326, and 328 (anonymities) to the LBS provider 310.

Usually, the data received from the LBS provider 310 may be much larger in quantity than the location information sent to the LBS provider 310 by the mobile device 320. Therefore, setting too many anonymities may lead to exceeding the traffic capacity or allowed bandwidth allocation because the service data increases proportionally to the number of the anonymities. The increased quantity of service data may also lead to unnecessary battery consumption.

Considering the bandwidth usage, B [bits/sec] may represent allocated or available bandwidth for the mobile device 320 and Qn [bits/sec] (with n=1, 2, . . . , N) may be the amount of LBS data transferred by the service provider for each location data set, where N is the number of the dummy data sets. As mentioned previously, the location information sent to the LBS provider 310 from the mobile device 320 may be omitted since it the data amount is small compared to the received data. Without loss of generality, the received LBS data may be expressed as Q1=Q2= . . . =QN. Thus, $$B \geq N*Qn, \quad [1]$$

from which follows $$N \leq B/Qn. \quad [2]$$

Similarly, the power usage for receiving Qn data may be defined as Pn [W]. If T [W] is the maximum available (or allowed) power, $$T \geq N*Pn, \quad [3]$$

from which follows $$N \leq T/Pn. \quad [4]$$

Thus, from equations [2] and [4], $$N \leq \min(B/Qn, T/Pn) \quad [5]$$

may be retrieved. Therefore, a maximum number of dummy location data sets or anonymities may be expressed as min (B/Qn, T/Pn).

When the user is not moving, (i.e., at a fixed location) and using a location based service, it is not easy for an intruder / hacker to detect the dummy data among the inquiries from the user. When the user is moving, however, the intruder may detect the dummy data and infer the user's location based on the trajectories of the dummy data sets. Thus, the dummy location data sets 322, 326, and 328 may be generated to project realistic and divergent from the user's path trajectories.

Figure 4:
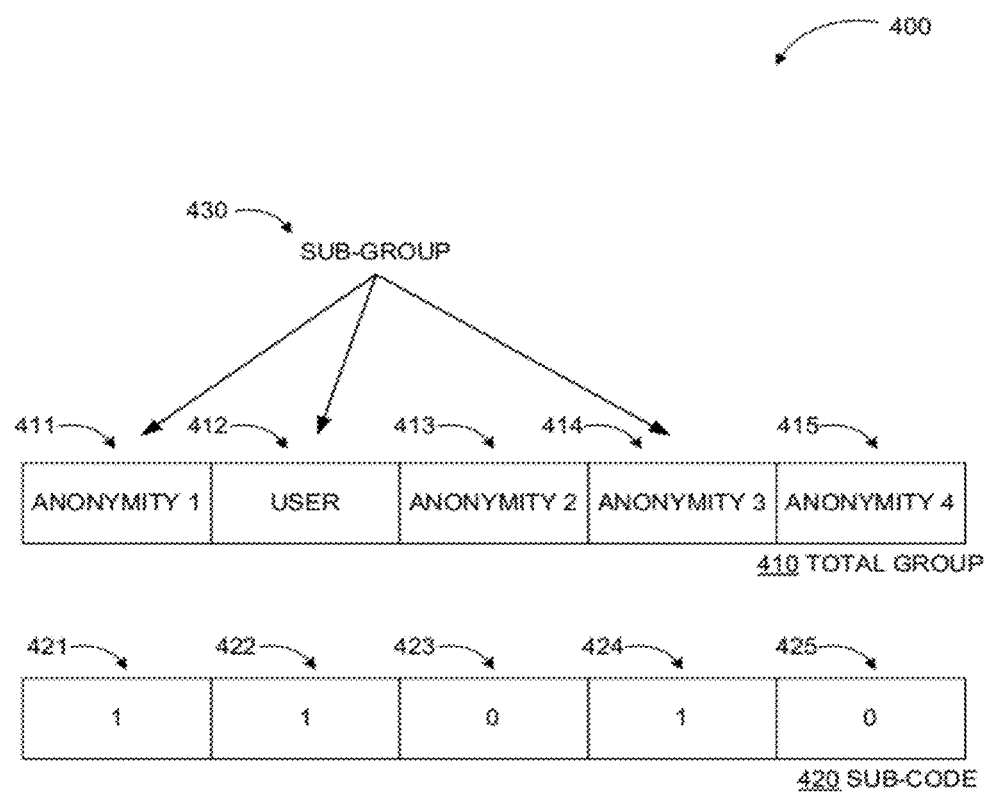
FIG. 4 illustrates an example data packet for location information including dummy information to protect location privacy.

FIG. 4 illustrates an example data packet for location information including dummy information to protect location privacy, arranged in accordance with at least some embodiments described herein. According to some embodiments, a mobile device may transmit the dummy location information even if the use is not creating any query related to LBS. Because the location information is sent regardless even with or without a query, the intruder may not be able to discern which information is the real information. Furthermore, the false information may be sent even with location determination turned off at the mobile device reducing power consumption. According to other embodiments, the user may be enabled to set the privacy protection level by adjusting a frequency of false information transmission.

As depicted in FIG. 4, a diagram 400 illustrates how anonymities (dummy location data sets) may be selected based on a sub-code from the LBS provider. A total group 410 is a group of location data sets (411-415), which the mobile device sends to the LBS provider. A sub-group 430 is the group of location data sets including the user's actual location 412 and a number of selected anonymities (e.g., 411 and 414), which the mobile device receives from the LBS provider. The number of anonymities in the total group 410 is larger than the number of anonymities selected for the sub-group 430.

A sub-code 420 is an index code that allows the mobile device to choose sub-groups within the total groups. The sub-code 420 may be generated during the initialization process when mobile devices first register with the LBS provider. According to some embodiments, the sub-code 420 may be viewed as a unique password. In the diagram 400, the sub-code data packet shows an order of the anonymities and actual user location information (421, 422, 423, 424, and 425) and which ones (421, 422, and 424) are actually transmitted.

Figure 5:
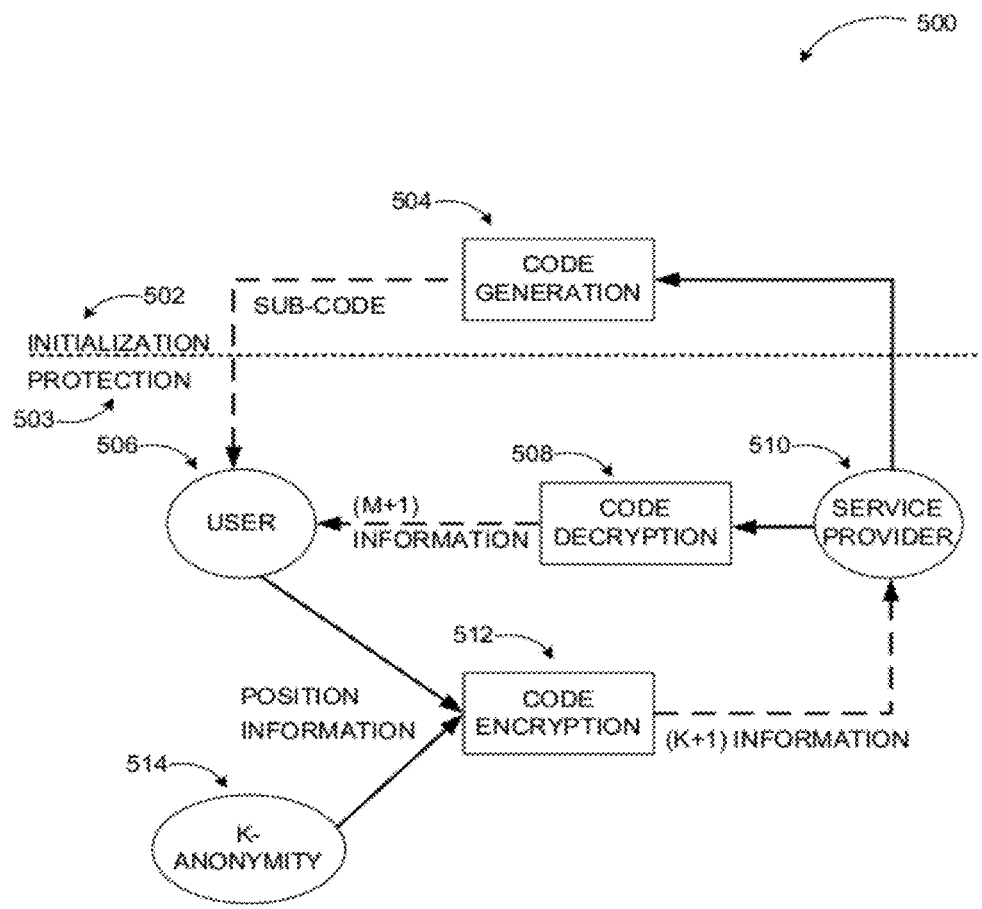
FIG. 5 illustrates a block diagram of an example dummy information system for use in conjunction with location based services.

FIG. 5 illustrates a block diagram 500 of an example dummy information system for use in conjunction with location based services, arranged in accordance with at least some embodiments described herein. As described above, a total group represents the group of location data sets (user+K anonymities) that can be sent to the LBS provider. Thus, the number may be expressed as K+1. The sub-group represents a group of user+M anonymities received by the user from the LBS provider. This second number is M+1, where K>M.

The flow of operations in a system according to embodiments, as shown in the diagram 500, includes an initialization process 502, where a user 506 first registers with an LBS provider 510. During an initialization process 502, the LBS provider 510 may generate different sub-codes for different users (504) and transmit them to the users. Because these codes may be permanently used once they are created, it may not be necessary to create them again, or they may be re-created at predetermined intervals for additional security. The code represents an index between the user and the sub-group.

During a privacy protection process 503, while the user 506 is actually using the LBS, the user 506 may send personal location information and K anonymities 514 (collectively "total group") to the LBS provider 510. At this stage, the user's location information may be encrypted (512) in order to place it in the middle of sub-codes with index number '1'. The LBS provider 510 may not process all the received (K+1) location data sets and send associated LBS data. The received data may be decrypted (508) using sub-code, and then corresponding (M+1) service data sets transmitted. Because the information provided by the LBS provider 510 is typically better protected against attacks, privacy may be protected even if the spatial cloaking domain is reduced.

Figure 6:
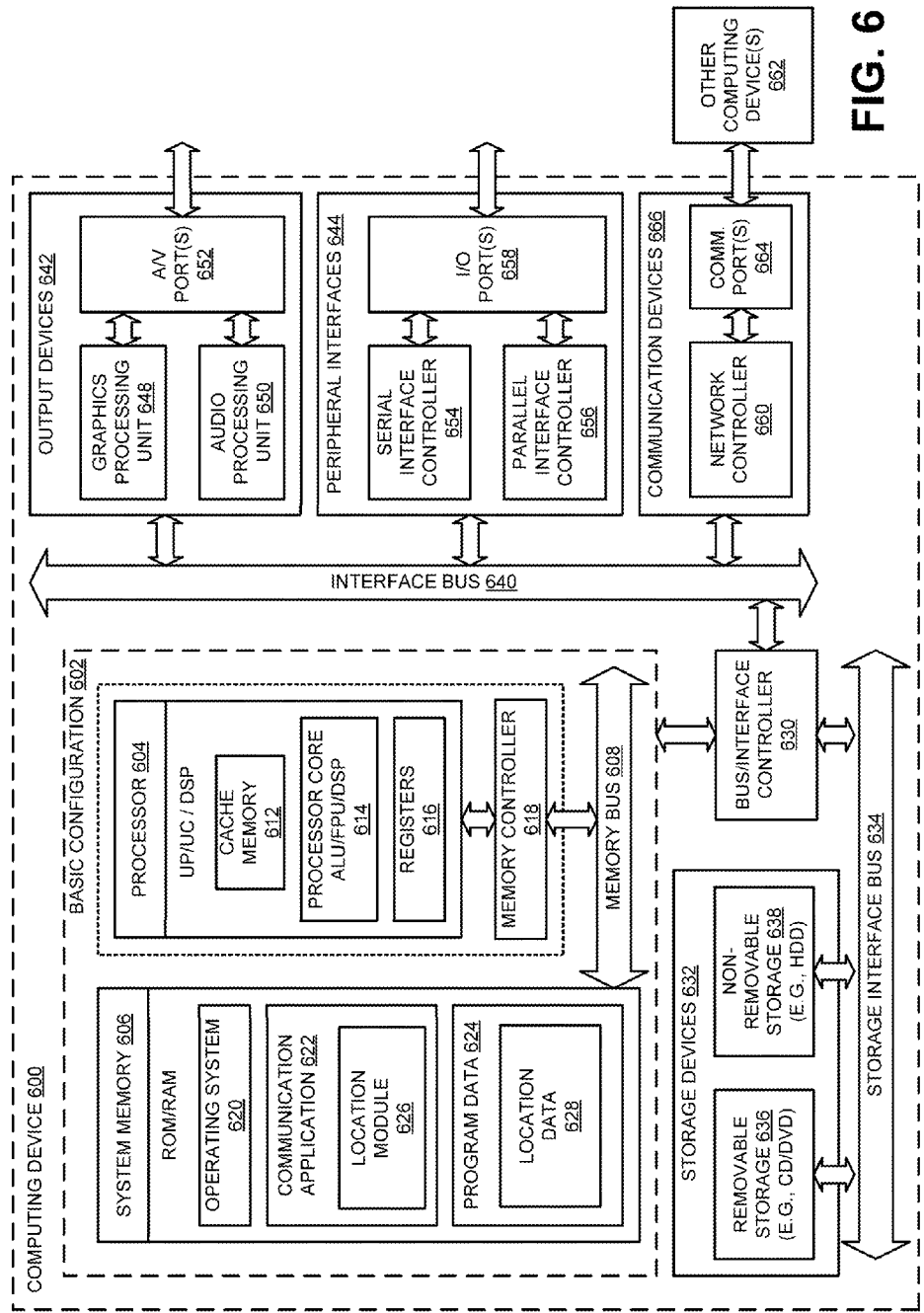
FIG. 6 illustrates a general purpose computing device, which may be used to implement dummy information for protection of location privacy.

FIG. 6 illustrates a general purpose computing device 600, which may be used to implement dummy information for protection of location privacy in accordance with at least some embodiments described herein. In a very basic configuration 602, computing device 600 typically includes one or more processors 604 and a system memory 606. A memory bus 608 may be used for communicating between the processor(s) 604 and the system memory 606.

Depending on the desired configuration, processor 604 may be of any type including but not limited to a microprocessor (µP), a microcontroller (µC), a digital signal processor (DSP), or any combination thereof. The processor(s) 604 may include one more levels of caching, such as a level cache memory 612, a processor core 614, and registers 616. The example processor core 614 may include an arithmetic logic unit (ALU), a floating point unit (FPU), a digital signal processing core (DSP Core), or any combination thereof. An example memory controller 618 may also be used with the processor(s) 604, or in some implementations a memory controller 618 may be an internal part of the processor(s) 604.

Depending on the desired configuration, the system memory 606 may be of any type including but not limited to volatile memory (such as RAM), non-volatile memory (such as ROM, flash memory, etc.) or any combination thereof. The system memory 606 may include an operating system 620, a communication application 622, and program data 624. The communication application 622 may include a location module 626 that is arranged to determine an actual location of the computing device 600, generate one or more dummy location data, and manage transmission of the dummy location data along with the actual location data to one or more LBS providers and any other processes, methods and functions as discussed above. The program data 624 may include one or more of location data 628 and similar data as discussed above in conjunction with at least FIG. 1 through 5. This data may be useful for generating dummy location data and providing actual location data along with dummy location data to protect location privacy as is described herein. In some embodiments, the communication application 622 may be arranged to operate with the program data 624 on an operating system 620 as described herein. This described basic configuration 602 is illustrated in FIG. 6 by those components within the inner dashed line.

The computing device 600 may have additional features or functionality, and additional interfaces to facilitate communications between the basic configuration 602 and any required devices and interfaces. For example, a bus/interface controller 630 may be used to facilitate communications between the basic configuration 602 and one or more data storage devices 632 via a storage interface bus 634. The data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (e.g., output devices 642, peripheral interfaces 644, and communication devices 666 to the basic configuration 602 via a bus/interface controller 630. The example output devices 642 include a graphics processing unit 648 and an audio processing unit 650, which may be configured to communicate to various external devices such as a display or speakers via one or more A/V ports 652. The example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 666 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a portion of a physical server, virtual server, a computing cloud, or a hybrid device that include any of the above functions. The computing device 600 may also be implemented as a personal computer including both laptop computer and non-laptop computer configurations. Moreover the computing device 600 may be implemented as a networked system or as part of a general purpose or specialized server.

Networks for a networked system including computing device 600 may comprise any topology of servers, clients, switches, routers, modems, Internet service providers, and any appropriate communication media (e.g., wired or wireless communications). A system according to embodiments may have a static or dynamic network topology. The networks may include a secure network such as an enterprise network (e.g., a LAN, WAN, or WLAN), an unsecure network such as a wireless open network (e.g., IEEE 802.11 wireless networks), or a world-wide network such (e.g., the Internet). The networks may also comprise a plurality of distinct networks that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

Figure 7:
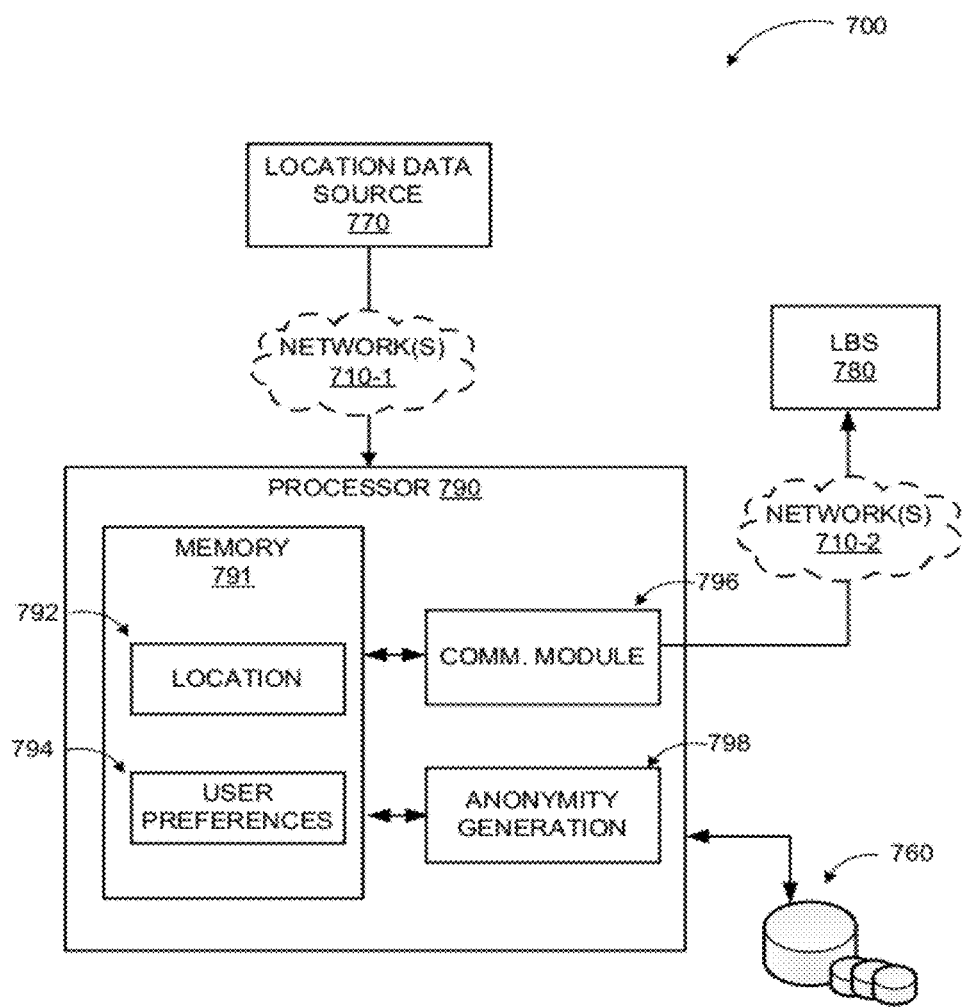
FIG. 7 illustrates a special purpose processor, which may be used to implement dummy information for protection of location privacy.

FIG. 7 illustrates a special purpose processor, which may be used to implement dummy information for protection of location privacy, arranged in accordance with at least some embodiments of the present disclosure. A processor 790 of a diagram 700 may be part of a mobile device communicatively coupled to one or more modules responsible for determining location of the mobile device, communicating over wired or wireless networks with LBS providers, etc.

The processor 790 may include a number of modules such as a communication module 796 configured to communicate over one or more network(s) 710-2 with one or more LBS provider(s) 780 to transmit location data (actual and dummy) and receive LBS related data in return, among other things. An anonymity generation module 798 may generate anonymous data such data dummy location information may be created and transmitted to the LBS provider(s) 780 along with the actual location data to protect privacy of a user of the mobile device.

A memory 791 may be configured to store instructions for the control modules of the processor 790, which may be implemented as hardware, software, or combination of hardware and software. Some of the data may include, but is not limited to, location data 792, user preferences 794, and similar information. The processor 790 may be configured to communicate through electrical couplings or through networked communications (e.g., one or more network(s) 710-1) with other computing devices, for example, one or more location data source(s) 770 and/or data stores such as a storage facility 760.

Example embodiments may also include methods. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 8:
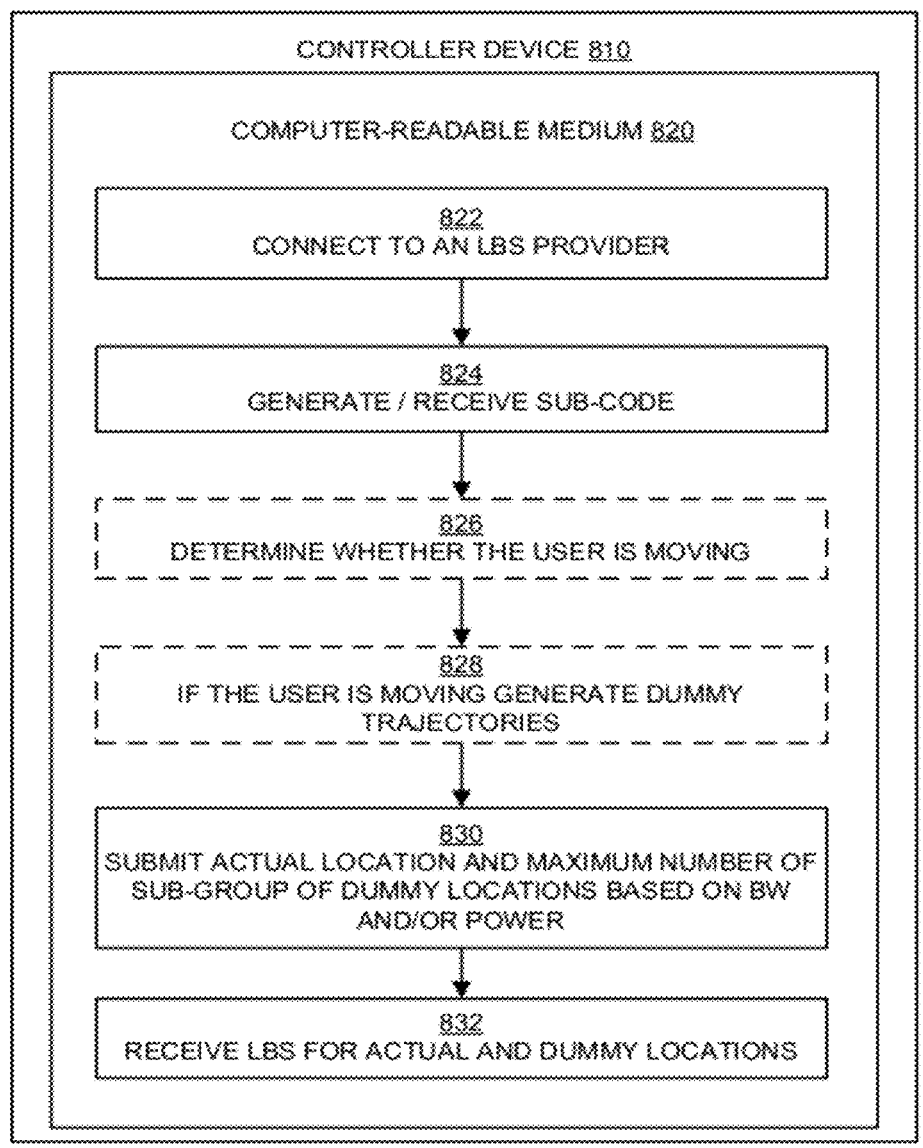
FIG. 8 is a flow diagram illustrating an example method for employing dummy information for protection of location privacy that may be performed by a computing device such as device 600 in FIG. 6 or a special purpose processor such as processor 790 of FIG. 7.

FIG. 8 is a flow diagram illustrating an example method for employing dummy information for protection of location privacy that may be performed by a computing device such as the computing device 600 in FIG. 6 or a special purpose processor such as the processor 790 of FIG. 7 in accordance with at least some embodiments described herein. The operations described in blocks 822 through 832 may be stored as computer-executable instructions in a computer-readable medium 820 and executed by a controller device 810, which may be the computing device 600 in FIG. 6, special purpose the processor 790 of FIG. 7, or a similar device.

A process of employing dummy information for protection of location privacy may begin with an operation 822, "CONNECT TO AN LBS PROVIDER." At the operation 822, a mobile device such as the mobile device 120 of FIG. 1 may communicate with an LBS provider and other location data sources such as a GPS provider to determine the location of the mobile device.

The operation 822 may be followed by an operation 824, "RECEIVE/GENERATE SUB-CODE." At the operation 824, an index code, also referred to as sub-code, may be predetermined between the user and the LBS provider, generated by the LBS provider and pre-shared with the user, or generated by the computing device connecting to the LBS provider and sent to the LBS provider. The sub-code may be generated during an initialization process when the mobile device first connects to the service provider similar to a password.

The operation 824 may be followed by an optional operation 826, "DETERMINE WHETHER THE USER IS MOVING." At the optional operation 826, the mobile device may determine is the user is moving based on changing actual location data. Even if sets of false location data are sent along with actual location data, a trajectory, and thereby an estimated location, of a user may be determined from the movement path. Therefore, dummy trajectories may be generated disguising the actual movement path of the user at an optional operation 828, "IF THE USER IS MOVING GENERATE DUMMY TRAJECTORIES," following the operation 826.

The optional operation 828 may be followed by an operation 830, "SUBMIT ACTUAL LOCATION AND SUB-GROUP OF MAXIMUM NUMBER OF DUMMY LOCATIONS BASED ON BW AND/OR POWER." At the operation 830, a sub-group of dummy location data sets may be selected based on the sub-code received/generated at the operation 824 and transmitted to the LBS provider along with the actual location data. The number of dummy location data sets to be transmitted may be determined to select a maximum number of dummy locations based on bandwidth availability and/or power availability at the mobile device.

The operation 830 may be followed by an operation 832, "RECEIVE LBS FOR ACTUAL AND DUMMY LOCATIONS." At the operation 832, the LBS data may be received based on the transmitted locations. Subsequently, the mobile device may filter out the LBS data for the dummy locations and present to the user the available LBS for the actual location.

The operations included in the above described process are for illustration purposes. Transmitting dummy information for location privacy may be implemented by similar processes with fewer or additional operations. In some examples, the operations may be performed in a different order. In some other examples, various operations may be eliminated. In still other examples, various operations may be divided into additional operations, or combined together into fewer operations.

Figure 9:
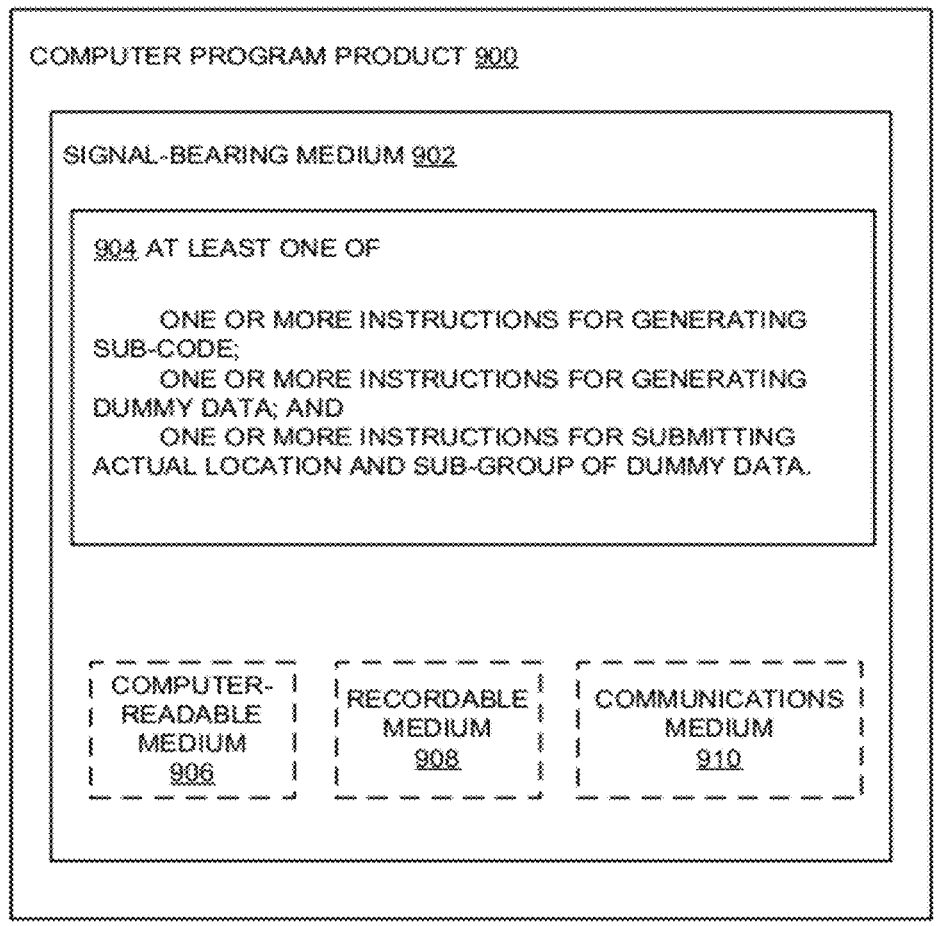
FIG. 9 illustrates a block diagram of an example computer program product, all arranged in accordance with at least some embodiments described herein.

FIG. 9 illustrates a block diagram of an example computer program product 900, arranged in accordance with at least some embodiments described herein. In some examples, as shown in FIG. 9, the computer program product 900 may include a signal bearing medium 902 that may also include machine readable instructions 904 that, when executed by, for example, a processor, may provide the functionality described above with respect to FIG. 6 or 7. Thus, for example, referring to the computing device 600, the location module 626 may undertake one or more of the tasks shown in FIG. 9 in response to the instructions 904 conveyed to the processor 604 by the signal bearing medium 902 to perform actions associated with transmitting dummy information for location privacy as described herein. Some of those instructions may be associated with generating a sub-code, generating a group of dummy location data, and submitting actual location information along with a sub-group of dummy location data selected from the generated group based on available bandwidth and/or power at the mobile device receiving the LBS.

In some implementations, the signal bearing medium 902 depicted in FIG. 9 may encompass a computer-readable medium 906, such as, but not limited to, a hard disk drive, a Compact Disc (CD), a Digital Versatile Disk (DVD), a digital tape, memory, etc. In some implementations, signal bearing medium 902 may encompass a recordable medium 908, such as, but not limited to, memory, read/write (R/W) CDs, R/W DVDs, etc. In some implementations, the signal bearing medium 902 may encompass a communications medium 910, such as, but not limited to, a digital and/or an analog communication medium (e.g., a fiber optic cable, a waveguide, a wired communications link, a wireless communication link, etc.). Thus, for example, program product 900 may be conveyed to one or more modules of the processor 790 by an RF signal bearing medium, where the signal bearing medium 902 is conveyed by a wireless communications medium 910 (e.g., a wireless communications medium conforming with the IEEE 802.11 standard).

The present disclosure describes a method for protecting location privacy by employing dummy information when using location based services. The method may include connecting to a location based service (LBS) provider and submitting a user's actual location and a first sub-group of dummy locations to the LBS provider. The first sub-group may be selected among a total group of dummy locations based on one or more constraints comprising an available bandwidth, a power consumption of a computing device connecting to the LBS provider, and/or a service requirement of the LBS provider. The method may further include receiving location based service data associated with a second sub-group of dummy locations and the user's actual location from the LBS provider, where the second sub-group is a subset of the first sub-group.

According to some examples, the total group of dummy locations may represent a maximum number of dummy locations allowed by the LBS provider regardless of any constraints, the first sub-group of dummy locations may represent a maximum number of dummy locations allowed to be submitted by the user based on the one or more constraints, and the second sub-group of dummy locations may represent locations for which LBS information is received from the LBS provider. The second sub-group of dummy locations may be selected using a sub-code that represents an index between the user's actual location and the second sub-group of dummy locations. The sub-code may be predetermined between the user and the LBS provider, generated by the LBS provider and pre-shared with the user, or generated by the computing device connecting to the LBS provider and sent to the LBS provider.

According to further examples, the first sub-group of dummy locations may be selected randomly among the total group of dummy locations based on the allowed number dummy locations. The user's actual location and the first sub-group of dummy locations may be encrypted for transmission to the LBS provider. Furthermore, a number of the dummy locations for the first sub-group, N, to be submitted to the LBS provider may be selected based on $N \leq \min(B/Q_n, T/P_n)-1$, where B represents an available bandwidth for the computing device connecting to the LBS provider, $Q_n$ represents an average amount of location service data to be transmitted by the LBS provider for each location, T represents a maximum permissible power usage for the computing device, and $P_n$ represents power usage rate for receiving $Q_n$.

The first sub-group of dummy locations may be transmitted to the LBS provider at one of predetermined periodic intervals and a random interval. Moreover, the user may be enabled to set a privacy protection level by adjusting a frequency of the transmission. According to other examples, the method may further include transmitting user's actual location information and the first sub-group of dummy locations to the LBS provider when a location determination service of the computing device is inactive and/or without a query to the LBS provider. The dummy location information may include at least one of made-up location information and/or past actual location information. The method may also include generating a trajectory for the dummy locations upon determination that the user is moving and transmitting the dummy locations along the generated trajectory such that a movement of the user is obscured.

The present disclosure further provides an apparatus for protecting location privacy by employing dummy information when using location based services. The apparatus may include a memory configured to store instructions and a processor coupled to the memory and adapted to execute the instructions. When the instructions are executed they may cause the processor to connect to a location based service (LBS) provider and submit a user's actual location and a first sub-group of dummy locations to the LBS provider. The first sub-group may be selected among a total group of dummy locations based on one or more constraints comprising an available bandwidth, a power consumption of apparatus, and/or a service requirement of the LBS provider. The processor may also receive location based service data associated with a second sub-group of dummy locations and the user's actual location from the LBS provider, where the second sub-group is a subset of the first sub-group.

According to some examples, the total group of dummy locations may represent a maximum number of dummy locations allowed by the LBS provider regardless of any constraints, the first sub-group of dummy locations may represent a maximum number of dummy locations allowed to be submitted by the user based on the one or more constraints, and the second sub-group of dummy locations may represent locations for which LBS information is received from the LBS provider. The processor may select the second sub-group of dummy locations using a sub-code that represents an index between the user's actual location and the second sub-group of dummy locations. The sub-code may be predetermined between the user and the LBS provider, generated by the LBS provider and pre-shared with the user, or generated by the computing device connecting to the LBS provider and sent to the LBS provider.

According to further examples, the processor may select the first sub-group of dummy locations randomly among the total group of dummy locations based on the allowed number dummy locations. The user's actual location and the first sub-group of dummy locations may be encrypted by the processor for transmission to the LBS provider. Furthermore, a number of the dummy locations for the first sub-group, N, to be submitted to the LBS provider may be selected based on $N \leq \min(B/Q_n, T/P_n)-1$, where B represents an available bandwidth for the computing device connecting to the LBS provider, $Q_n$ represents an average amount of location service data to be transmitted by the LBS provider for each location, T represents a maximum permissible power usage for the computing device, and $P_n$ represents power usage rate for receiving $Q_n$.

The processor may transmit the first sub-group of dummy locations to the LBS provider at one of predetermined periodic intervals and a random interval. Moreover, the user may be enabled to set a privacy protection level by adjusting a frequency of the transmission. According to other examples, the processor may be further configured to transmit user's actual location information and the first sub-group of dummy locations to the LBS provider when a location determination service of the computing device is inactive and/or without a query to the LBS provider. The dummy location information may include at least one of made-up location information and/or past actual location information. The processor may also generate a trajectory for the dummy locations upon determination that the user is moving and transmit the dummy locations along the generated trajectory such that a movement of the user is obscured.

The present disclosure also describes a computer-readable storage medium with instructions stored thereon for a method of protecting location privacy by employing dummy information when using location based services. The method may include connecting to a location based service (LBS) provider and submitting a user's actual location and a first sub-group of dummy locations to the LBS provider. The first sub-group may be selected among a total group of dummy locations based on one or more constraints comprising an available bandwidth, a power consumption of a computing device connecting to the LBS provider, and/or a service requirement of the LBS provider. The method may further include receiving location based service data associated with a second sub-group of dummy locations and the user's actual location from the LBS provider, where the second sub-group is a subset of the first sub-group.

According to some examples, the total group of dummy locations may represent a maximum number of dummy locations allowed by the LBS provider regardless of any constraints, the first sub-group of dummy locations may represent a maximum number of dummy locations allowed to be submitted by the user based on the one or more constraints, and the second sub-group of dummy locations may represent locations for which LBS information is received from the LBS provider. The second sub-group of dummy locations may be selected using a sub-code that represents an index between the user's actual location and the second sub-group of dummy locations, and the sub-code may be predetermined between the user and the LBS provider, generated by the LBS provider and pre-shared with the user, and/or generated by the computing device connecting to the LBS provider and sent to the LBS provider.

The first sub-group of dummy locations may be selected randomly among the total group of dummy locations based on the allowed number dummy locations, and the method may include selecting a number of the dummy locations for the first sub-group, N, to be submitted to the LBS provider based on $N \leq \min(B/Q_n, T/P_n)-1$, where B represents an available bandwidth for the computing device connecting to the LBS provider, $Q_n$ represents an average amount of location service data to be transmitted by the LBS provider for each location, T represents a maximum permissible power usage for the computing device, and $P_n$ represents power usage rate for receiving $Q_n$. According to other examples, the method may further include transmitting the first sub-group of dummy locations to the LBS provider at predetermined periodic intervals or a random interval, and transmitting user's actual location information and the first sub-group of dummy locations to the LBS provider when a location determination service of the computing device is inactive.

The present disclosure describes yet another method for enabling protection of location privacy by employing dummy information in conjunction with location based services. The method may include registering a user at a location based service (LBS) provider and receiving the user's actual location and a first sub-group of dummy locations at the LBS provider. The first sub-group may be selected among a total group of dummy locations based on one or more constraints comprising an available bandwidth, a power consumption of a computing device connecting to the LBS provider, and/or a service requirement of the LBS provider. LBS data associated with a second sub-group of dummy locations and the user's actual location may be provided to the computing device connecting to the LBS provider, where the second sub-group is a subset of the first sub-group.

The total group of dummy locations may represent a maximum number of dummy locations allowed by the LBS provider regardless of any constraints, the first sub-group of dummy locations may represent a maximum number of dummy locations allowed to be received from the user based on the one or more constraints, and the second sub-group of dummy locations may represent locations for which LBS information is sent by the LBS provider.

According to some examples, the second sub-group of dummy locations may be selected using a sub-code that represents an index between the user's actual location and the second sub-group of dummy locations, and the sub-code may be predetermined between the user and the LBS provider, generated by the LBS provider and pre-shared with the user, or generated by the computing device connecting to the LBS provider and sent to the LBS provider. The first sub-group of dummy locations may be selected randomly among the total group of dummy locations based on the allowed number dummy locations. Furthermore, a number of the dummy locations for the first sub-group, N, to be submitted to the LBS provider may be selected based on $N \leq \min(B/Q_n, T/P_n)-1$, where B represents an available bandwidth for the computing device connecting to the LBS provider, $Q_n$ represents an average amount of location service data to be transmitted by the LBS provider for each location, T represents a maximum permissible power usage for the computing device, and $P_n$ represents power usage rate for the computing device to receive $Q_n$.

The other method according to some examples may further include causing the computing device to transmit the first sub-group of dummy locations to the LBS provider at one of predetermined periodic intervals and a random interval and enabling the user to set a privacy protection level by adjusting a frequency of the transmission. Transmittal of the user's actual location information and the first sub-group of dummy locations to the LBS provider may be enabled when a location determination service of the computing device is inactive. Moreover, the dummy location information may include at least one of made-up location information and/or past actual location information. According to further examples, the method may further include enabling the computing device to generate a trajectory for the dummy locations upon determination that the user is moving and enabling transmittal of the dummy locations along the generated trajectory such that a movement of the user is obscured.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, materials, and configurations, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control modules (e.g., adjusting location determination or anonymous information generation parameters).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes"

should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for protecting location privacy by employing dummy information when using location based services, the method comprising:
   connecting to a location based service (LBS) provider;
   submitting a user's actual location and a first sub-group of dummy locations representing a maximum number of dummy locations allowed to be submitted by the user based on one or more constraints to the LBS provider, wherein the first sub-group is selected among a total group of dummy locations representing a maximum number of dummy locations allowed by the LBS provider regardless of any constraints, the one or more constraints comprising an available bandwidth, a power consumption of a computing device connecting to the LBS provider, and/or a service requirement of the LBS provider; and
   receiving location based service data associated with a second sub-group of dummy locations and the user's actual location from the LBS provider, wherein the second sub-group is a subset of the first sub-group and the second sub-group of dummy locations is selected using a sub-code that represents an index between the user's actual location and the second sub-group of dummy locations.

2. The method according to claim 1, wherein the sub-code is one of: predetermined between the user and the LBS provider, generated by the LBS provider and pre-shared with the user, or generated by the computing device connecting to the LBS provider and sent to the LBS provider.

3. The method according to claim 1, further comprising:
   selecting a number of the dummy locations for the first sub-group, N, to be submitted to the LBS provider based on $N \leq \min(B/Q_n, T/P_n) - 1$, where B represents an available bandwidth for the computing device connecting to the LBS provider, $Q_n$ represents an average amount of location service data to be transmitted by the LBS provider for each location, T represents a maximum permissible power usage for the computing device, and $P_n$ represents power usage rate for receiving $Q_n$.

4. The method according to claim 1, further comprising:
   transmitting the first sub-group of dummy locations to the LBS provider at one of predetermined periodic intervals and a random interval.

5. The method according to claim 4, further comprising:
   enabling the user to set a privacy protection level by adjusting a frequency of the transmission.

6. The method according to claim 4, further comprising:
   transmitting user's actual location information and the first sub-group of dummy locations to the LBS provider when a location determination service of the computing device is inactive.

7. An apparatus for protecting location privacy by employing dummy information when using location based services, comprising:
   a memory configured to store instructions;
   a processor coupled to the memory, wherein the processor is adapted to execute the instructions, which when executed configure the processor to:

connect to a location based service (LBS) provider;

submit a user's actual location and a first sub-group of dummy locations representative of a maximum number of dummy locations allowed to be submitted by the user based on one or more constraints to the LBS provider, wherein the first sub-group is selected among a total group of dummy locations representative of a maximum number of dummy locations allowed by the LBS provider regardless of any constraints, the one or more constraints comprising an available bandwidth, a power consumption of apparatus, and/or a service requirement of the LBS provider; and receive location based service data associated with a second sub-group of dummy locations and the user's actual location from the LBS provider, wherein the second sub-group is a subset of the first sub-group and the second sub-group of dummy locations is selected using a sub-code that represents an index between the user's actual location and the second sub-group of dummy locations.

8. The apparatus according to claim 7, wherein the sub-code is one of: predetermined between the user and the LBS provider, generated by the LBS provider and pre-shared with the user, or generated by the computing device connecting to the LBS provider and sent to the LBS provider.

9. The apparatus according to claim 7, wherein the processor is further configured to:

select a number of the dummy locations for the first sub-group, N, to be submitted to the LBS provider based on $N \leq \min(B/Q_n, T/P_n)-1$, where B represents an available bandwidth for the apparatus, $Q_n$ represents an average amount of location service data to be transmitted by the LBS provider for each location, T represents a maximum permissible power usage for the apparatus, and $P_n$ represents power usage rate for receiving $Q_n$.

10. The apparatus according to claim 7, wherein the processor is further configured to:

transmit the first sub-group of dummy locations to the LBS provider at one of predetermined periodic intervals and a random interval.

11. The apparatus according to claim 7, wherein the processor is further configured to:

upon determination that the user is moving, generate a trajectory for the dummy locations; and transmit the dummy locations along the generated trajectory such that a movement of the user is obscured.

12. A method for enabling protection of location privacy by employing dummy information in conjunction with location based services, the method comprising:

registering a user at a location based service (LBS) provider;

receiving the user's actual location and a first sub-group of dummy locations representing a maximum number of dummy locations allowed to be submitted by the user based on one or more constraints at the LBS provider, wherein the first sub-group is selected among a total group of dummy locations representing a maximum number of dummy locations allowed by the LBS provider regardless of any constraints, the one or more constraints comprising an available bandwidth, a power consumption of a computing device connecting to the LBS provider, and/or a service requirement of the LBS provider; and providing LBS data associated with a second sub-group of dummy locations and the user's actual location to the computing device connecting to the LBS provider, wherein the second sub-group is a subset of the first sub-group and the second sub-group of dummy locations is selected using a sub-code that represents an index between the user's actual location and the second sub-group of dummy locations.

13. The method according to claim 12, wherein the sub-code is one of:

predetermined between the user and the LBS provider;

generated by the LBS provider and pre-shared with the user; and generated by the computing device connecting to the LBS provider and sent to the LBS provider.

14. The method according to claim 12, wherein the first sub-group of dummy locations is selected randomly among the total group of dummy locations based on the allowed number dummy locations.

15. The method according to claim 12, further comprising:

enabling transmittal of the user's actual location information and the first sub-group of dummy locations to the LBS provider when a location determination service of the computing device is inactive.

16. The method according to claim 12, wherein dummy location information includes at least one of made-up location information and/or past actual location information.

17. The method according to claim 12, further comprising:

enabling the computing device to generate a trajectory for the dummy locations upon determination that the user is moving; and enabling transmittal of the dummy locations along the generated trajectory such that a movement of the user is obscured.

* * * * *